United States Patent [19]

Brunken et al.

[11] Patent Number: 4,685,549

[45] Date of Patent: Aug. 11, 1987

[54] TEMPERATURE-DEPENDENTLY CONTROLLABLE FLUID FRICTION CLUTCH

[75] Inventors: Gerd Brunken, Dittelbrunn; Werner Göb, Kürnach; Oswald Reis, Gädheim, all of Fed. Rep. of Germany

[73] Assignee: Fichtel & Sachs AG, Schweinfurt, Fed. Rep. of Germany

[21] Appl. No.: 805,973

[22] Filed: Dec. 6, 1985

[30] Foreign Application Priority Data

Dec. 8, 1984 [DE] Fed. Rep. of Germany ....... 3444928

[51] Int. Cl.[4] .................. F16D 35/00; F16D 43/75
[52] U.S. Cl. .................. 192/58 B; 192/82 T; 192/112
[58] Field of Search ............... 192/82 T, 58 A, 58 B, 192/112

[56] References Cited

U.S. PATENT DOCUMENTS

| 3,893,555 | 7/1975 | Elmer | 192/58 B |
|---|---|---|---|
| 4,086,987 | 5/1978 | Riley et al. | 192/58 B |
| 4,269,295 | 5/1981 | Kish | 192/82 T |
| 4,505,367 | 3/1985 | Martin | 192/58 B |

FOREIGN PATENT DOCUMENTS

| 3122960 | 1/1983 | Fed. Rep. of Germany . |
|---|---|---|
| 2071823 | 9/1981 | United Kingdom .............. 192/58 B |
| 2111653 | 7/1983 | United Kingdom . |

*Primary Examiner*—Rodney H. Bonck
*Assistant Examiner*—David A. Testardi
*Attorney, Agent, or Firm*—Toren, McGeady & Associates

[57] ABSTRACT

The temperature-dependently controllable fluid friction clutch comprises a temperature-control device for the shear fluid circulation, with a bimetallic element (35) held on an end wall of the housing (7) and coupled, through a pin (39) freely displaceably guided in a bore (37), with a valve (25, 27) of the temperature-control device. To seal the pin (39) in relation to the housing (7) on the part of the pin (39) issuing from the housing (7) there is set a sealing element (41) which rests under axial stress through a sealing flange (43) of substantially annular disc form on a sealing surface (45) extending transversely of the axis (1) of rotation. The sealing flange (43) has substantially the form of a relatively shallow or flat frusto-conical shell widening towards the sealing surface (45) and is stressed substantially only to flex elastically. In this way friction forces between the pin (39) and the bore (37) can be reduced, which improves the accuracy of the temperature control.

8 Claims, 3 Drawing Figures

1

TEMPERATURE-DEPENDENTLY CONTROLLABLE FLUID FRICTION CLUTCH

BACKGROUND OF THE INVENTION

The invention relates to a temperature-dependently controllable fluid friction clutch, particularly for a radiator fan of a motor vehicle.

From Federal German Publication Specification No. 3,122,960 a temperature-dependently controllable fluid friction clutch for the cooling fan of a motor vehicle is known in which a housing carrying the fan blades is mounted rotatably on a drive shaft. The housing is divided by a partition into a reservoir for shear fluid and an axially adjacent working chamber. In the working chamber there is arranged a rotor held on the drive shaft, which rotor together with the housing forms at least one shear gap. Within the housing a control device is arranged which controls the flow circulation of the shear fluid between the reservoir and the working chamber. A bimetallic element arranged on an end wall outside the housing acts upon the control device through a pin guided axially displaceably in an opening of the end wall. The control device comprises a valve arranged in the reservoir which blocks the shear fluid circulation to disconnect the clutch and frees it to engage the clutch.

The pin is axially displaceable in a bore of the end wall of the housing and is sealed off from the housing by a gasket seated in an annular groove in the bore. The seal firstly prevents the penetration of dirt into the interior of the housing and secondly prevents the escape of shear fluid, for example during transport of the clutch before it is installed. By reason of its friction the gasket has an unfavorable effect upon the actuation behavior of the clutch and prevents a pressure equalization between the reservoir and the atmosphere.

The present invention provides a temperature-controlled fluid friction clutch the actuation behavior of which is not impaired by the sealing of the pin of the temperature-control device.

SUMMARY OF THE INVENTION

Within the scope of the invention the pin which transmits the control movement of a bimetallic element, arranged outside the housing of the clutch, into the interior of the housing is sealed off by a seal element which is held on the pin axially outside the housing bore which guides the pin. The seal element has a sealing flange of substantially annular disc form which merely rests with its outer edge on an outer sealing face of the end wall. The bore in the end wall has to fulfil no sealing function but only the guidance of the pin. The pin is therefore seated in very easily moving manner, that is with very slight friction, in the bore. Only the elastic bending forces exerted upon the sealing flange in the displacement of the pin have to be applied. In this way an exact temperature control of the clutch can be achieved.

The sealing flange preferably has the form of a frusto-conical shell which widens towards the housing. Relatively slight forces are necessary for the axial deformation of the sealing flange which lies with its outer edge on the end wall of the housing, particularly if the angle of conicity is relatively great and lies for example in the range of 120°. By the dimensioning of the sealing element it can be achieved that the sealing flange abuts on the end wall of the housing within the entire stroke range of the pin or only in a part of the stroke range. In any case the dimensioning ensures that in the range of regulation of the control device controlling the shear fluid circulation only the seal flange is axially elastically stressed, or the seal flange is lifted away from the sealing face of the end wall.

The bimetallic element pushes the pin into the housing to disengage the clutch. The seal element is so dimensioned that at least when the clutch is disengaged the seal flange rests on the end wall of the housing. In the range of pin positions in which the clutch is completely engaged, the seal flange rests on the sealing face of the end wall only with slight initial stress, or extends at a short distance for example of a few tenths of a millimeter from the sealing face. In both situations, occurring at high working temperatures, the reservoir can vent itself automatically without danger of soiling of the housing interior from the outside.

The sealing element consists of elastic, preferably rubber-elastic material, so that a basic body of the sealing element holding the seal flange can be deformed axially, possibly with radial expansion, outside the range of regulation of the control device controlling the shear fluid circulation. In order to ensure a return of the basic body, in this case clamped directly between the bimetallic element and the end wall of the housing, the basic body is preferably seated in frictional engagement on the pin. The axial deformation properties of the basic body for the one part and the flexure properties of the seal flange for the other part can be improved if the basic body comprises an external circumferential groove which merges directly into the seal flange.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
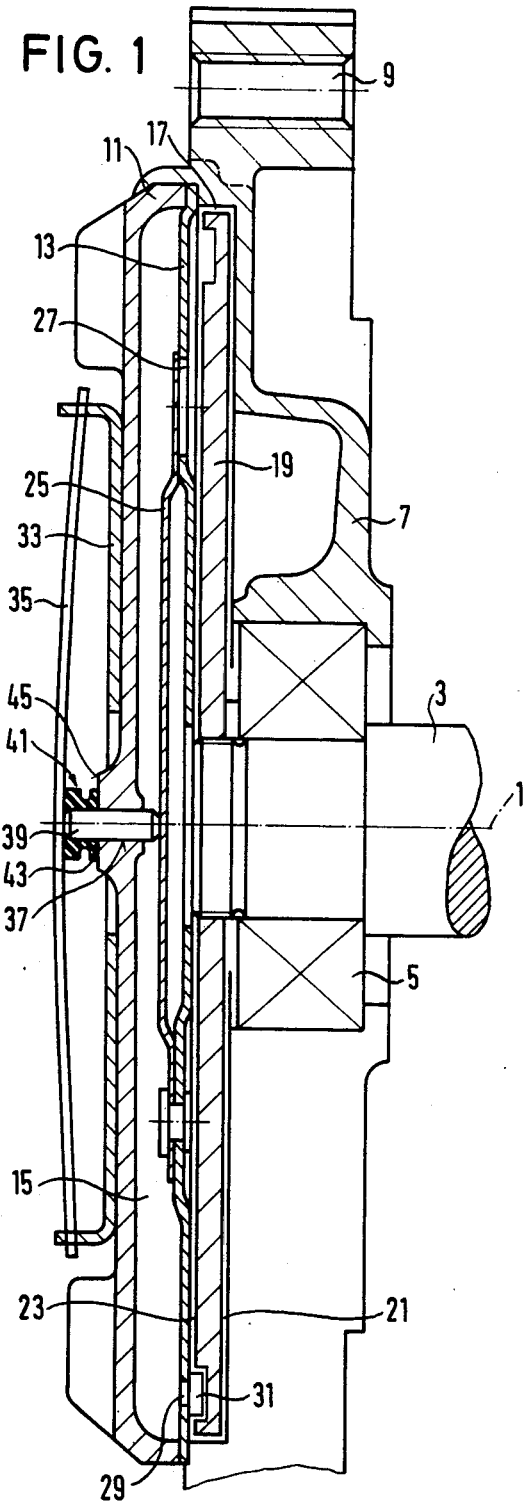
FIG. 1 shows a diagrammatic axial longitudinal section through a temperature-dependently controllable fluid friction clutch for a cooling fan of a motor vehicle.

The fluid friction clutch as represented in FIG. 1 comprises a drive shaft 3 driven in rotation about a rotation axis 1 by an internal combustion engine (not shown). On the shaft a housing 7 is coaxially rotatably mounted by means of a sealed ball bearing 5. The housing 7 carries securing elements 9 for the securing of fan blades (not shown further) of a cooling fan of the motor vehicle. The housing 7, tightly closed by an end wall lid 11, is divided by a partition 13 into a reservoir 15 for a shear fluid and an axially adjacent working chamber 17. In the working chamber 17 there is arranged a rotor 19 which is firmly connected with the drive shaft 3 and forms shear gaps 21, 23 with mutually facing faces of the housing 7 and of the partition 13. The clutch is engaged when the shear gaps 21, 23 are filled with shear fluid, in which case the shear fluid transmits the drive torque of the drive shaft 3 through the rotor 19 to the housing 7. The clutch is disengaged when the shear gaps 21, 23 are emptied of shear fluid.

The operational condition of the clutch is controlled by a valve device which comprises a valve plate 25 arranged in the reservoir 15 and secured to the partition 13. The valve plate 25 controls a valve opening 27 arranged in the partition 13 at a radial distance from its external circumference. In the region of the external circumference of the partition 13 a pump opening 29 is provided by way of which a pump device 31, effective on relative rotation of the rotor 19 and the housing 7 and working for example according to the dynamic pressure principle, delivers the shear fluid out of the working chamber 17 back into the reservoir 15. The valve plate 25 is controlled by a bimetallic element 35 secured in a fitting 33 on the outside of the end wall lid 11. The bimetallic element 35 is of substantially elongated form and acts with its middle region upon the valve plate 25 through a cylindrical pin 39 axially displaceable in a central bore 37 of the end wall lid 11. The valve plate 25 is stressed away from the valve opening 27 elastically towards the bimetallic element 35 by reason of its inherent stress, and clamps in the pin 39 between itself and the bimetallic element 35.

FIG. 1 shows the clutch in the cold condition in which the valve plate 25 closes the valve opening 27 and interrupts the shear fluid circulation. The pump device 31 on relative rotation of the rotor 19 and the housing 7 pumps the working chamber 17 empty, whereby the clutch is disengaged. In the hot condition the middle region of the bimetallic element 35 moves axially away from the end wall lid 11, whereupon the valve plate 25 by reason of its inherent elasticity lifts away from the valve opening 27 and opens the shear fluid circuit. The shear fluid flowing from the reservoir 15 through the valve opening 27 into the working chamber 17 fills the shear gaps 21, 23, whereby the clutch is engaged. The transition from the completely disengaged to the completely engaged condition and vice versa takes place gradually according to the temperature of the bimetallic element 35 arranged adjacent to the radiator of the motor vehicle.

Compared with the pin 39, the bore 37 is over-dimensioned so that the pin 39 is displaceable in the bore 37 with very easy movement. The sealing of the pin 39 from the end wall lid 11 takes place with the aid of an annular sealing element 41 of rubber-elastic material which is set upon the part of the pin emerging outwards from the end wall lid 11 and held in frictional engagement there. The sealing element 41, explained in greater detail hereinafter, comprises on its side axially facing the end wall lid 11 a sealing flange 43 of substantially annular disc form which rests axially under stress on an outer sealing face 45 extending perpendicularly to the axis 1 of rotation, with its outer edge, at least when the clutch is in the cold and thus disengaged condition. In the control movement of the pin 39 the sealing element 41 generates no friction forces, but rather is merely elastically deformed. The deformation forces however are comparatively slight.

Figure 2:
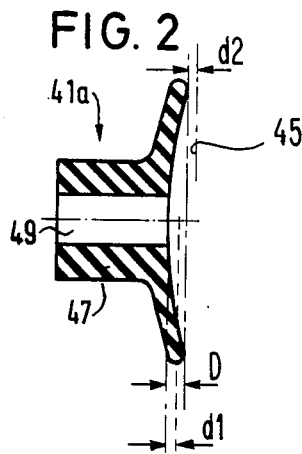
FIG. 2 shows a sectional view of a first embodiment of a sealing element usable with the clutch according to FIG. 1.

FIG. 2 shows details of a sealing element 41a usable in the clutch according to FIG. 1. The sealing element 41a has a basic body 47 of sleeve form which is fittable with its central opening 49 on to the pin 39. The basic body 47 is seated in frictional engagement upon the pin 39 and is entrained in the control movement of the latter. The sealing flange 51 which corresponds to the sealing flange 43 has the form of a substantially frusto-conical shell which widens towards the sealing surface 45 and rests with its outer edge 53, which forms a sealing lip, on the sealing surface 45.

Figure 3:
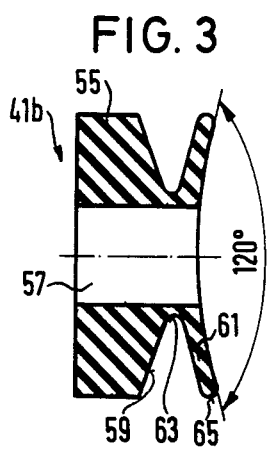
FIG. 3 shows a sectional view of a second embodiment of a sealing element usable with the clutch according to FIG. 1.

FIG. 3 shows a variant, designated in general as 41b, of the sealing element with a basic body 55 likewise of sleeve form which is fittable with its central sleeve opening 57 on the pin 39 and is held in frictional engagement on the pin. An external circumferential groove 59 of substantially V-shaped cross-section of the basic body 55 separates a sealing flange 61, corresponding to the sealing flange 43, from the basic body. The external circumferential groove 59 merges directly into the sealing flange 61 and with its groove bottom 63 forms an articulation zone which facilitates the axial deformation of the sealing flange 61 and if desired the axial compression of the sealing element 41b as a whole. The sealing flange 61 has a substantially frusto-conical form and widens towards the sealing surface 45 on which it rests with its outer edge 65 forming a sealing lip. The angle of conicity of the sealing elements 41a, 41b lies in the order of magnitude of about 120°.

By the dimensioning of the cone height and the angle of conicity of the sealing element 41, 41a or 41b it is possible to ensure, in a first variant of the clutch according to FIG. 1, that the sealing element rests with the outer edge of its sealing flange 43, 51 or 61 as the case may be on the sealing surface 45, in every position of the pin 39. At least in the range of regulation of the valve plate 25 the sealing flange 43, 51 or 61 exclusively is axially flexurally elastically stressed. The outer edge of the sealing flange lies, in the entire range of regulation, with slight stress against the sealing surface 45 and permits an automatic venting of the reservoir 15 to the atmosphere. In FIG. 2 the internal cone frustum height D is greater than the axial stroke dl of the pin 39 effected by the bimetallic element 35 so that in every position of the pin the sealing flange 51 rests on the sealing surface 45.

In a second variant, by the dimensioning of the sealing element 41, 41a or 41b the object is achieved that the sealing flange 43, 51 or 61 lifts with its outer edge slightly, for example a few tenths of a millimeter, away from the sealing surface 45, at least when the clutch is engaged by complete opening of the valve opening 27, that is in the hot operating condition. By this measure the venting of the reservoir 15, which is expedient particularly at high working temperatures, is facilitated. The range of positions of the pin 39 in which the sealing flange 43, 51 or 61 is lifted away from the sealing surface 45 can also extend substantially over the entire range of regulation of the valve plate 25, so that the sealing element rests on the sealing surface 45 in sealing manner only outside this range of regulation, in the cold operating condition. By this measure the force necessary for the displacement of the pin 39 is further reduced, which permits very exact regulation. Since the stroke of the pin 39 is very small, the danger of penetration of dirt into the interior of the clutch is slight. In the cold condition the interior space is sealed off, so that no shear fluid can escape, even during the transport of the not yet installed clutch. For the last-mentioned operating situation the sealing element 41, 41a or 41b can be so dimensioned that it is axially compressed by the bimetallic element 35 with widening of its sealing flange to 180°. Since the sealing element is seated on the pin 39 merely with frictional engagement, it can carry out the axial compression movement in relation to the pin 39. In FIG. 2 the dimension d2 indicates the amount that the sealing flange 54 is lifted away from the sealing surface 45 at least in a range of positions of the pin in which the control device substantially completely liberates the flow circulation.

While specific embodiments of the invention have been shown and described in detail to illustrate the application of the inventive principles, it will be understood that the invention may be embodied otherwise without departing from such principles.

We claim:

1. A temperature-dependently controllable fluid friction clutch, comprising
   (a) a drive shaft (3),
   (b) a housing (7) rotatably mounted on the drive shaft (3) and divided by a partition (13) into a reservoir (15) for shear fluid and an axially adjacent working chamber (17),
   (c) a rotor (19) arranged in the working chamber (17) and held on the drive shaft (3), which rotor together with the housing forms at least one shear gap (21, 23),
   (d) a control device (25,27,29,31) within the housing (7) and controlling a flow circulation of the shear fluid between the reservoir (15) and the working chamber (17),
   (e) a bimetallic element (35) arranged outside the housing (7) on an end wall (11) of the housing extending transversely of the drive shaft (3),
   (f) an axially extending pin (39) coupling the bimetallic element (35) with the control device (25,27,29,31) and being axially displaceable in an opening (37) of the end wall (11), as pin (39) having one end located outside the housing (7) and being movably away from the end wall (11) for engagement of the clutch and towards the end wall (11) for disengagement of the clutch,
   (g) a sealing element (41,41a,41b) of elastic material annularly enclosing the pin
      wherein the sealing element being held in sealed manner on a part of the pin (39) protruding from the housing (7), said element comprising a sealing flange (43,51,61) of substantially annular elastic disc form having an annular outer peripheral edge (53,65) which protrudes to the end wall (11) and rests in sealed manner under axial stress on an outer sealing surface (45) of the end wall (11), extending perpendicularly of the path of displacement of the pin (39), at least in a partial zone of the displacement path of the pin, and the outer peripheral edge (53,65) being unattached to the sealing surface so as to be capable of lifting off the sealing surface (45).

2. A fluid friction clutch according to claim 1, wherein the sealing element comprises a basic body of sleeve form provided with the sealing flange on its end axially facing the housing and wherein the sealing flange has the form of a substantially frusto-conical shell which widens towards the housing.

3. A fluid friction clutch according to claim 2, wherein said sealing flange having an internal cone frustum height and said pin having an axial stroke effected by the bimetallic element and the internal cone frustum height of the sealing flange is greater than the axial stroke of the pin effected by the bimetallic element, so that in every position of the pin the sealing flange rests on the sealing surface.

4. A fluid friction clutch according to claim 2, wherein the sealing element is so dimensioned that the sealing flange rests on the sealing surface at least in a range of positions of the pin in which the control device blocks the flow circulation of the shear fluid.

5. A fluid friction clutch according to claim 4, wherein the sealing element is so dimensioned that the sealing flange is lifted away from the sealing surface at least in a range of positions of the pin in which the control device substantially completely liberates the flow circulation.

6. A fluid friction clutch according to claim 2, wherein the angle of conicity of the sealing flange amounts to about 120°.

7. A fluid friction clutch according to claim 2, wherein the basic body has on its external circumference a circumferential groove which merges directly into the sealing flange.

8. A fluid friction clutch according to claim 2, wherein the basic body is held in frictional engagement on the pin.

* * * * *